United States Patent
Bruce et al.

(10) Patent No.: US 7,686,984 B2
(45) Date of Patent: Mar. 30, 2010

(54) MANGANESE OXIDE MATERIAL FOR ELECTROCHEMICAL CELLS

(75) Inventors: Peter George Bruce, Fife (GB); Alastair Douglas Robertson, Fife (GB)

(73) Assignee: University Court of the University of St. Andrews (GB)

( * ) Notice: Subject to any disclaimer, the term of this patent is extended or adjusted under 35 U.S.C. 154(b) by 1253 days.

(21) Appl. No.: 10/483,199

(22) PCT Filed: Jun. 26, 2002

(86) PCT No.: PCT/GB02/02905

§ 371 (c)(1),
(2), (4) Date: Jun. 4, 2004

(87) PCT Pub. No.: WO03/009407

PCT Pub. Date: Jan. 30, 2003

(65) Prior Publication Data

US 2004/0214086 A1    Oct. 28, 2004

(30) Foreign Application Priority Data

Jul. 14, 2001 (GB) ................................ 0117235.2

(51) Int. Cl.
*H01B 1/02* (2006.01)
(52) U.S. Cl. .............................. 252/518.1; 423/594.14; 423/599; 429/224; 429/231.1; 429/231.95
(58) Field of Classification Search .............. 252/518.1; 429/217, 224, 231.4, 338, 231.3, 231.95, 429/231.1; 29/623.5; 423/594.15, 599
See application file for complete search history.

(56) References Cited

U.S. PATENT DOCUMENTS 5,609,975 A  *  3/1997  Hasegawa et al. ............ 429/217

(Continued)

FOREIGN PATENT DOCUMENTS

EP    0918041 A1  *  8/1997

(Continued)

OTHER PUBLICATIONS

Alastair D. Robertson, A. Robert Armstrong, Allan J. Paterson, Morven J. Duncan and Peter G. Bruce, Nonstoichiometric layered LixMnyO2 intercalation electrodes—a multiple dopant strategy, J. Mater. Chem. 2003, 13, 2367-2373.

(Continued)

*Primary Examiner*—Mark Kopec
*Assistant Examiner*—Khanh Tuan Nguyen
(74) *Attorney, Agent, or Firm*—Barnes & Thornburg LLP

(57) ABSTRACT

There is provided a manganese oxide material, wherein the material comprises a host material $Q_qMn_yM_zO_x$, where Q and M are each any element, y is any number greater than zero, and q and z are each any number greater than or equal to zero, and at least one dopant substituted into the host material, the manganese oxide material having a layered structure in which the ions are arranged in a series of generally planar layers, or sheets, stacked one on top of another. In a particularly preferred material Q is Li and M is either Co, Ni, Al, or Li. Particularly preferred combinations of M and a dopant are Ni,Co; Al,Co; Li,Cu; Li,Al; and Li,Zn. A method of preparing the material is also disclosed.

9 Claims, 3 Drawing Sheets

U.S. PATENT DOCUMENTS

| | | | |
|---|---|---|---|
| 5,626,635 A * | 5/1997 | Yamaura et al. | 29/623.5 |
| 5,683,835 A * | 11/1997 | Bruce | 429/224 |
| 6,040,089 A * | 3/2000 | Manev et al. | 429/231.1 |
| 6,214,493 B1 * | 4/2001 | Bruce et al. | 429/224 |
| 6,361,756 B1 * | 3/2002 | Gao et al. | 423/599 |
| 6,368,750 B1 * | 4/2002 | Nemoto et al. | 429/231.95 |
| 6,372,385 B1 * | 4/2002 | Kweon et al. | 429/231.95 |
| 6,620,400 B2 * | 9/2003 | Gao et al. | 423/594.15 |
| 6,660,432 B2 * | 12/2003 | Paulsen et al. | 429/231.3 |
| 6,699,456 B1 * | 3/2004 | Krampitz et al. | 423/594.15 |
| 6,998,069 B1 * | 2/2006 | Coluccia et al. | 252/518.1 |
| 2002/0037458 A1 * | 3/2002 | Yamaguchi et al. | 429/338 |
| 2002/0076613 A1 * | 6/2002 | Lee et al. | 429/231.1 |

FOREIGN PATENT DOCUMENTS

| | | | |
|---|---|---|---|
| EP | 0944125 A1 * | 3/1999 | |
| JP | 8-273665 | 10/1996 | |
| JP | 10-134812 | * 5/1998 | |
| JP | 11-086845 | * 3/1999 | |
| JP | 2000-294242 | * 10/2000 | |
| JP | 2001-236450 | 1/2001 | |
| WO | WO 97/26683 A1 * | 7/1997 | |

OTHER PUBLICATIONS

Partial English Translation of Japanese Patent Laying-Open No. 2000-294242 (reference 3).

* cited by examiner

MANGANESE OXIDE MATERIAL FOR ELECTROCHEMICAL CELLS

FIELD OF INVENTION

This invention concerns electrochemical cells and relates to material with a layered structure for use in such cells, a method for producing the layered materials, and a cell having the layered materials as the positive electrode.

BACKGROUND TO THE INVENTION

Electrochemical cells generally have a negative electrode, a positive electrode, and an electrolyte placed between the electrodes. The electrolyte is chosen so that transfer of ions between the two electrodes occurs, thus producing an electrical current. One example of an electrochemical cell is a rechargeable battery. The use of layered materials such as lithium cobalt oxide, $LiCoO_2$, as the positive electrode in such a rechargeable battery is well established. The layered material consists of sheets of oxygen ions stacked one on top of the other. Between the first and second layers of oxygen are located the cobalt ions, with the lithium ions being located between the second and third oxygen layers. Use of $LiCoO_2$ in rechargeable batteries allows greater energy storage per unit weight and volume than is possible in conventional rechargeable batteries such as nickel-cadmium. However $LiCoO_2$ has disadvantages in that it is somewhat toxic, is less safe than is desirable, has limited energy storage capacity, and the cobalt containing materials from which it is produced are expensive and scarce.

Attempts have been made to use other compounds with a similar layered structure to that of, $LiCoO_2$, such as $LiNiO_2$, and $LiFeO_2$. EP 0 017 400 discloses a range of compounds having layers of the $\alpha$-$NaCrO_2$ structure. In an International Patent Application, Publication No. WO97/26683, we disclosed the synthesis and viability of materials of the form $Q_qMn_yM_zO_2$, where Q and M are each any element, y is any number greater than zero, and q and z are each any number greater than or equal to zero, and the material is a layered structure. It is one aim of the present invention to provide a further layered manganese oxide material which can be used in electrochemical cells.

SUMMARY OF THE INVENTION

According to one aspect of the present invention, there is provided a manganese oxide material, wherein the material comprises a host material $Q_qMn_yM_zO_x$, where Q and M are each any element, y is any number greater than zero, and q and z are each any number greater than or equal to zero, and at least one dopant substituted into the host material, the manganese oxide material having a layered structure. Any number of dopants may be substituted into the host material, with the number of simultaneously occurring dopants possible only being restricted by the requirement to retain a layered structure. Such a material may be written as $Q_qMn_yM_zA_aB_bC_c\ldots\gamma_nO_x$, where A, B, C $\ldots \gamma_n$ are dopants. Typically for such a material the values of z, a, b, c, $\ldots$, n will be chosen to sum equal to one.

A layered structure is one in which the ions are arranged in a series of generally planar layers, or sheets, stacked one on top of another. In general, each layer contains ions of one particular element. Thus, when z is equal to zero and q is greater than zero, the layering will consist of sheets of oxide ions which are separated by alternating layers of Q ions and Mn ions, i.e. the layers order as a layer of oxide ions, a layer of Mn ions, a layer of oxide ions, a layer of Q ions and a layer of oxide ions; this is repeated throughout the structure.

Q is preferably chosen from Group I elements, i.e. K, Li, Rb, and in a particularly preferred material is Li so that the host material is of the form $Li_wMn_yM_zO_x$, where w is any number greater than zero.

Where z is not equal to zero, the M ions will occupy sites in the Mn layers, and if desired M within the host material can be viewed as a first dopant with at least one further dopant being substituted within the material.

Where z is not equal to zero, the element M is typically chosen from Group II elements, the transition elements or from Group III elements. Suitable elements include Be, Mg, Ca, Sc, Ti, V, Cr, Fe, Co, Ni, Cu, Zn, Al, Ga, P. However Group I elements such as Li may also be used as a dopant.

In a particularly preferred material according to the invention, Q is Li and M is either Co, Ni, Al, or Li.

Preferably at least one dopant is chosen from Group II elements, the transition elements or from Group III elements. Suitable elements include Ni, Al, Co, Mg, Zn and Cu.

Particularly preferred combinations of M and a dopant are Ni, Co; Al, Co; Li, Co; Li, Ni; Li, Mg; Li,Cu; Li,Al; and Li, Zn.

According to a further aspect of the invention, there is provided a method of preparing a manganese oxide material of the invention, comprising processing an intermediate material $X_xMn_yM_zA_aB_bO_x$ (or any number of elements n additional to M, A and B), where X is a Group I element not being lithium, M, A and B are any element, a, x and y are each any number greater than zero, and z, and b are any number greater than or equal to zero, by an ion exchange reaction with a reactant containing lithium ions, so as to replace X with lithium and produce a material of the form $Li_wMn_yM_zA_aB_bO_x$, where w is any number greater than zero, and the material has a layered structure. If M is to be incorporated, then z is chosen to be greater than zero.

Preferably X is chosen to be Na, so that the intermediate material is of the form $Na_xMn_yM_zA_aB_bO_x$.

The reactant may be any suitable lithium salt, such as LiBr or LiCl. Preferably the ion exchange reaction is achieved by heating the reactant and intermediate material under reflux. Typically n-pentanol, n-hexanol, ethanol or n-octanol are used as the reflux agent, with the reflux period being 96 hours.

In a particularly preferred exchange reaction, the ion exchange occurs at room temperature and in water.

According to a further aspect of the invention, there is provided a method of preparing a manganese oxide material of the invention, comprising processing a precursor material $Q_qMn_yM_zA_aB_bO_x$, where Q and M are each any element, q and y are each any number greater than zero, z and b are any number greater than or equal to zero, and a is greater than zero by carrying out an ion removal reaction, so as to remote Q and produce a material of the form $Mn_yM_zA_aB_bO$, with a layered structure.

Ion removal is conveniently achieved by electrochemical extraction, using the precursor material as the working electrode in an electrochemical cell. This is of particular advantage in preparation of materials of the form $Mn_yM_zA_aB_bO_x$. For preparation of these materials, Q is preferably chosen from the Group I or Group II elements, such as Na, K, Rb, Mg or Ca. The $Mn_yM_zA_aB_bO_x$ may be subsequently processed to insert lithium so as to produce $Li_wMn_yM_zA_aB_bO_x$.

According to another aspect of the invention, there is provided an electrochemical cell, wherein the positive electrode is of the form $Li_qMn_yM_zA_aB_bO_x$ where M, A and B are any elements, x, y, z and a are any number greater than zero, and q and b are each any number greater than or equal to zero. The use of the manganese in the electrode avoids the need for use of cobalt or nickel which is of advantage as manganese is less toxic, safer, more abundant and cheaper than cobalt and nickel.

A rechargeable battery is an example of an electrochemical cell with which the invention may be used.

BRIEF DESCRIPTION OF THE SEVERAL VIEWS OF THE DRAWINGS

The invention will now be described by way of example, and with reference to the accompanying Figures in which.

DESCRIPTION

Figure 1A:
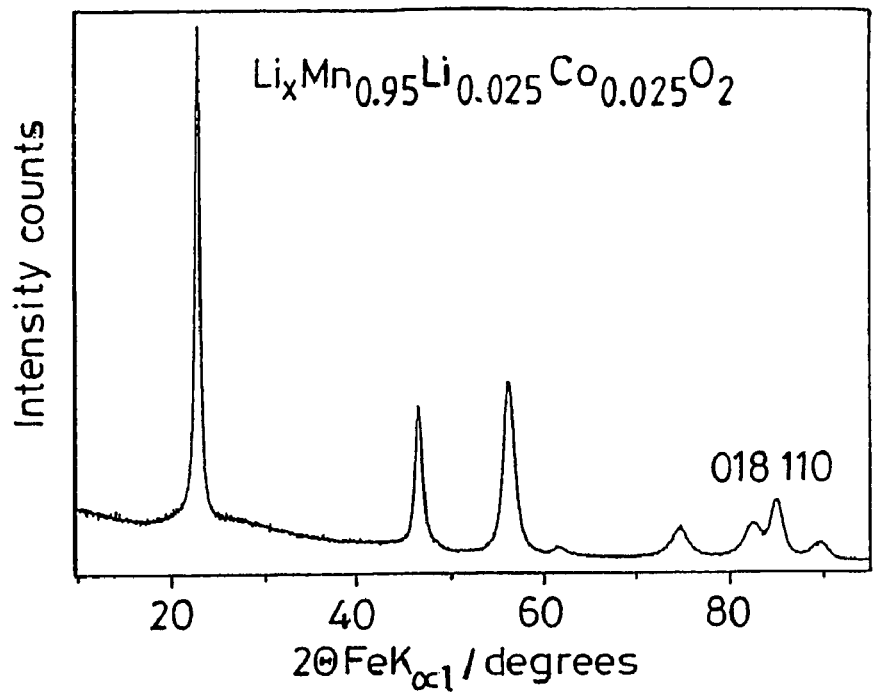
FIGS. 1(a) and 1(b) show the observed diffraction data of a material according to the invention, where M is Li and the dopant is Co, FIG. 1(a) being an X-ray diffraction trace and FIG. 1(b) a neutron diffraction trace.

The preparation of materials of the form $Q_qMn_yM_zO_2$ incorporating one or more dopants, and the experimental verification of the structure of such materials and their properties as an electrode for an electrochemical cell will be described. If desired, one can view $Q_qMn_yO_2$ as the base or host material into which M and or at least one other dopant are substituted, producing a double dopant system. However substitution is only limited by the requirement to have a layered structure, and multiple dopants can be substituted into the original structure.

Preparation

Preparation of the materials requires two stages:

1) The preparation of the intermediate material, sodium manganese oxide, $NaMnO_2$ combined with the dopants, i.e. of the form $Na_qMn_yM_zA_aB_bO_x$, where A is one additional dopant, and B is another additional dopant; and 2) Ion exchange reaction.

Stage 1

(a) Solid State Preparation

Appropriate quantities of the Na source such as $Na_2CO_3$, a Manganese oxide such as $Mn_2O_3$, MnO or $MnO_2$ and oxides of the dopant elements are weighed out and intimately ground together with or without a dispersant such as acetone. As will be apparent to a person skilled in the art, NaOH, $Na(CH_3CO_2)$ or any other solid Na compound which decomposes on heating to yield the oxide can be used instead of $Na_2CO_3$, and any solid Mn source which decomposes on heating to yield the oxide can be used to provide a source of Mn. Any source of the elements M, A, B etc. which decomposes on heating to yield the oxide can be used to supply the dopants.

The resulting homogenous mixture of Na source, Mn source and dopant sources is heated in a furnace until a material of the form $Na_qMn_yM_zA_aB_bO_x$ is produced. Whether an air, reducing or oxidising atmosphere is required within the furnace depends on the elements M, A, B and the furnace heating and cooling characteristics chosen will depend on M, A and B. Typically temperatures of between 250° C. and 1500° C. are chosen for anything between 1-96 hours and the samples may be furnace cooled or cooled more quickly.

The intermediate material can also be prepared from solution, and where required solution preparation is as follows.

(b) Solution Preparation

Suitable salts of Na, Mn, M, A, B etc. which are soluble in $H_2O$, ethanol, n-hexanol or similar solvents, for example $Na_2CO_3$, $NaCH_3CO_2$, $Mn(CH_3CO_2)_2$ and $A(CH_3CO_2)_n$, $B(CH_3CO_2)$, are weighed out and added to the solvent. After mixing, the solvent is removed by heating and if required using reduced pressure. The resulting homogenous mixture is then heated at a low temperature between 80-150° C. for between 1-5 hours, and then at temperatures between 250-1500° C. for 1-96 hours in air, or if appropriate depending on the combination of elements M, A, B in a more reducing or more oxidising atmosphere. As before the samples may be furnace cooled or cooled more quickly, such as by air cooling.

Stage 2

An excess, typically 8-15 fold of a Lithium salt such LiBr, LiCl or $LiNO_3$, is added to a solvent such as ethanol, butanol, n-hexanol, n-octanol, acetonitrile, water or a combination of some of these. To this mixture is added the intermediate material prepared either by solid state reaction or from solution as above, and the various constituents allowed to react for between 6 and 96 hours at a suitable temperature. Where the reaction is carried out at elevated temperatures, then a condenser is fitted permitting reflux. For example ion exchange in ethanol may be carried out by refluxing at 80° C. or in the case of n-hexanol 160° C. Particularly of interest is that the ion exchange reaction is possible at room temperature and in water. After reaction the mixture is subjected to filtration under suction and then washed with a solvent used for exchange, typically alcohol or alcohol and water, before being dried.

Alternatively ion exchange is carried out in a molten salt containing a Lithium source. For this, the sample is mixed with the ion exchange medium and heated until the medium is molten. The temperature is maintained for 1-96 hours until exchange is complete. After cooling the ion exchange medium is removed by washing in $H_2O$, alcohol or other solvent. The resulting material is dried by heating under vacuum.

The structure of the resultant product was then examined by X-ray diffraction or by neutron diffraction. Determination of the structure by neutron diffraction requires the observed diffraction data from a representative sample of the product to be compared to theoretical diffraction data for a variety of structural models. The correct structural model produces the best fit between theoretical and observed data. Typically trial models are selected by looking at the structures of similar families of compounds, or from the structures of the compounds that formed the product.

Time-of-flight powder neutron diffraction data were collected on the POLARIS high intensity, medium resolution diffractometer at the ISIS pulsed source at the Rutherford Appleton Laboratory. Data from the highest resolution back-scattering bank of detectors were used for structural analysis.

Figure 1B:
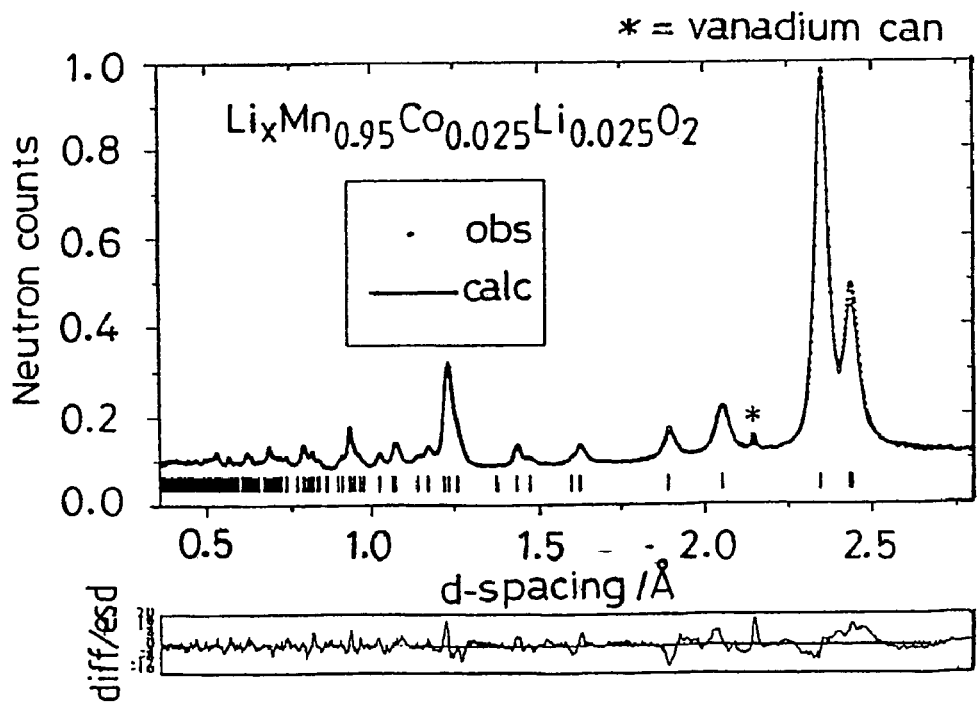

FIG. 1(a) shows the X-ray diffraction pattern of $Li_xMn_{0.95}Li_{0.025}Co_{0.025}O_2$, with thus M being Li and the additional dopant being Co and FIG. 1(b) shows the neutron diffraction pattern of the same compound. Various other combinations of dopants have been investigated including the following (where the first element is equivalent to M in the general formula given above and the second element the additional dopant): Co, Ni; Co, Al; Li, Co; Li, Ni; Li, Al; Li, Mg; Li, Zn; Li, Cu.

The materials produced in accordance with the present invention have a layered structure in which the Mn, Li and O ions are arranged separately in a series of generally planar layers, or sheets, stacked one on top of another, with the dopants substituting into these layers. Generally the dopants substitute randomly into the Mn layers, although some of the dopant ions may be present in the Li layers. The layering will thus consist of sheets of oxide ions which are separated by alternating layers of Li ions and Mn ions, i.e. the layers order as a layer of oxide ions, a layer of Mn ions, a layer of oxide ions, a layer of Q ions and a layer of oxide ions; this is repeated throughout the structure.

The layered structure possesses a crystal symmetry lower than rhombohedral and is generally monoclinic. The monoclinic structure possesses one 2-fold axis and/or one plane of symmetry, its unit cell possessing three unequal axes, one axis being perpendicular to the other two axes which are inclined at an oblique angle. In such a structure the Mn ions are not equally spaced from all nearest neighbour oxide ions, i.e. the three oxide ions in the adjacent upper layer and the three oxide ions in the adjacent lower layer, but rather are distorted from equal spacing so that the Mn—O bond distance varies. An equivalent view of this is that the layered structure comprises layers of MnO6 polyhedra separated by layers of other ions, for example lithium ions.

Lattice parameter data for selected materials are given below:

TABLE 1

Lattice parameter data for $Li_xMn_{1-y}Ni_{y/2}Co_{y/2}O_2$ system

| Nominal y | a/Angstrom | c/Angstrom | c/a |
|---|---|---|---|
| 0.025 | 2.8652 (4) | 14.674 (2) | 5.121 |
| 0.05 | 2.8731 (3) | 14.638 (1) | 5.095 |
| 0.10 | 2.8667 (3) | 14.612 (2) | 5.097 |
| 0.20 | 2.8699 (3) | 14.620 (1) | 5.094 |

TABLE 2

Lattice parameter data for $Li_xMn_{1-y}Li_{y/2}Ni_{y/2}O_2$ system

| Nominal y | a/Angstrom | c/Angstrom | c/a |
|---|---|---|---|
| 0.05 | 2.8672 (3) | 14.618 (1) | 5.098 |

TABLE 3

Lattice parameter data for $Li_xMn_{1-y}Li_{y/2}Co_{y/2}O_2$ system

| Nominal y | a/Angstrom | C/Angstrom | c/a |
|---|---|---|---|
| 0.05 | 2.8614 (3) | 14.614 (1) | 5.107 |

TABLE 4

Lattice parameter data for $Li_xMn_{1-y}Li_{y/2}Mg_{y/2}O_2$ system

| Nominal y | a/Angstrom | C/Angstrom | c/a |
|---|---|---|---|
| 0.05 | 2.8690 (4) | 14.641 (2) | 5.103 |

Figure 2:
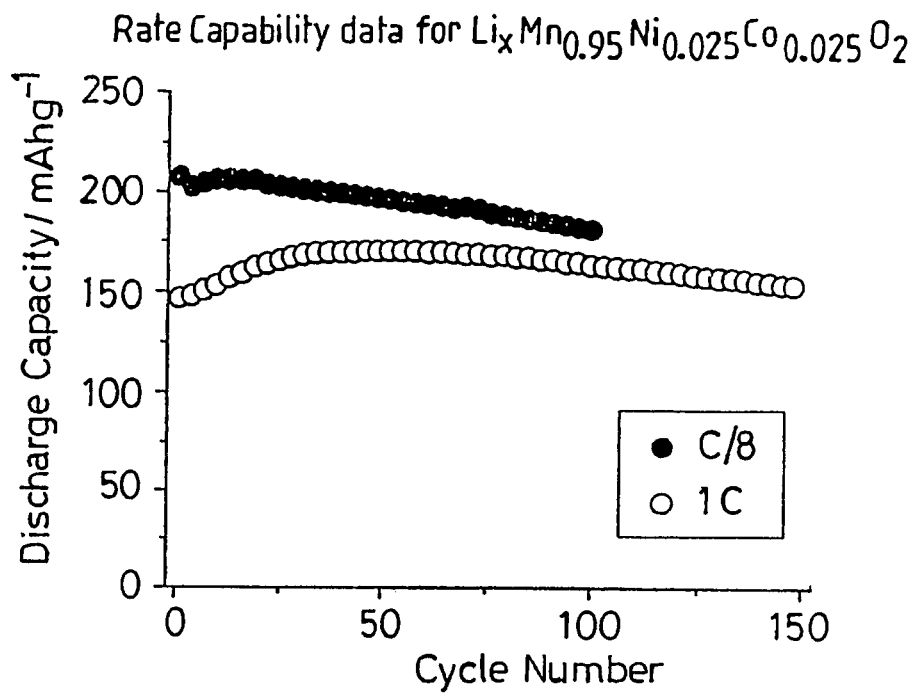
FIG. 2 shows the discharge capacity of a cell incorporating a further material according to the invention on successive discharge cycles, where M is Ni and the dopant Co.
Figure 3:
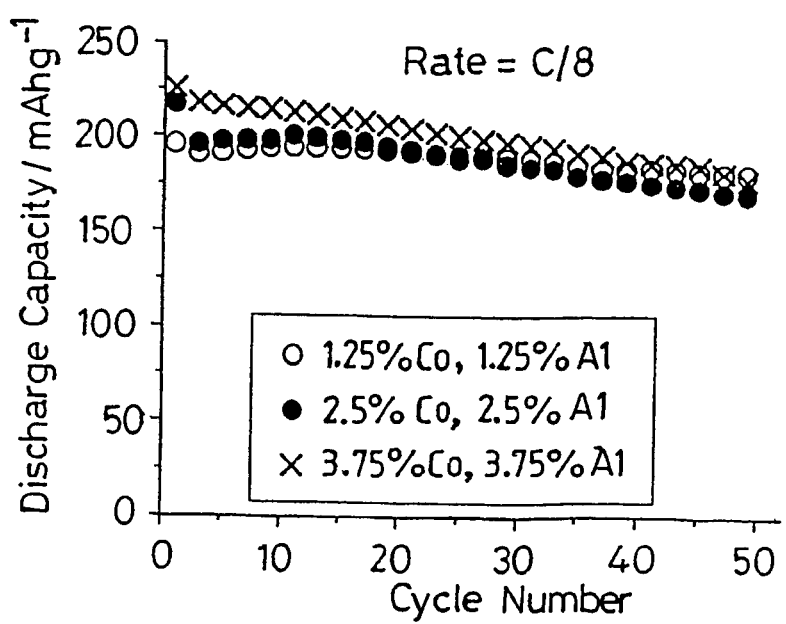
FIG. 3 shows the discharge capacity of a cell incorporating a further material according to the invention on successive discharge cycles, where M is Co and the dopant Al.
Figure 4:
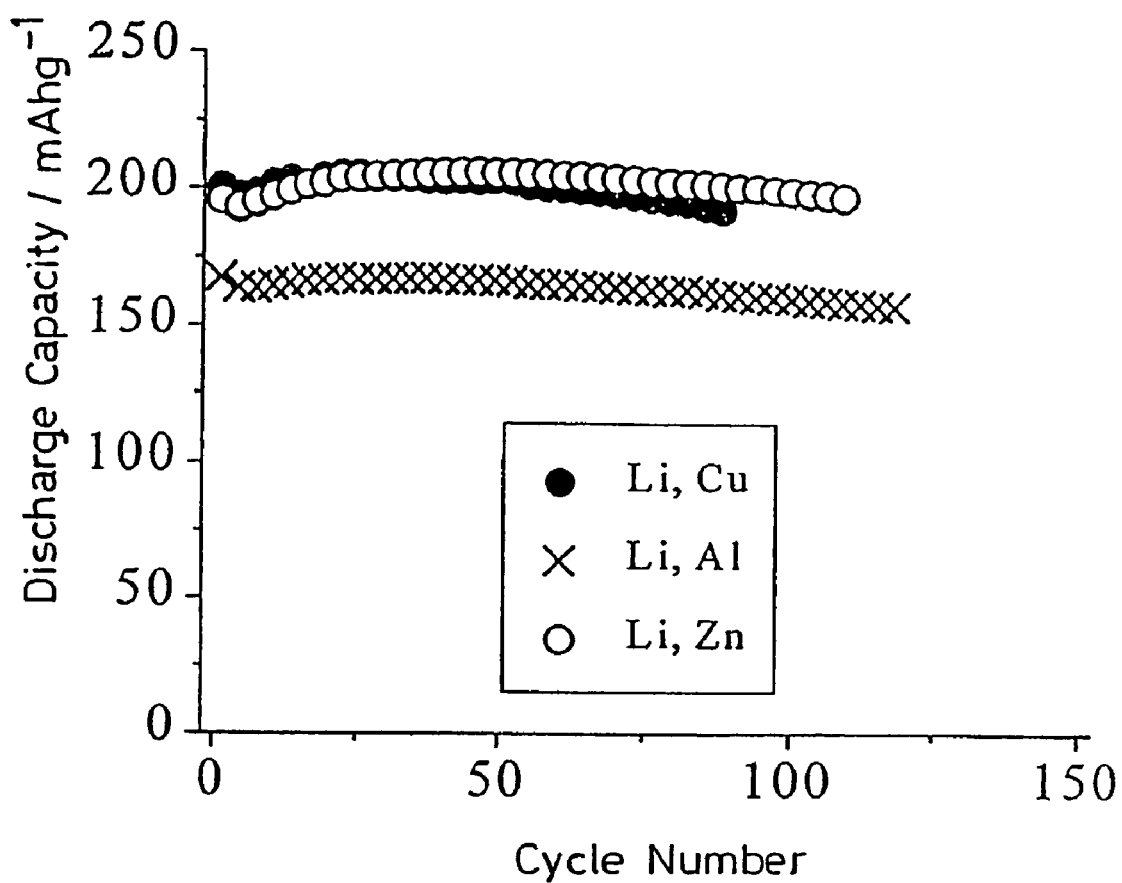
FIG. 4 shows the discharge capacity of a cell incorporating a further material according to the invention on successive discharge cycles, where M is Li and the dopant is either Cu or Al or Zn.

The performance of various materials in accordance with the present invention in an electrochemical cell is shown in FIGS. 2 to 4. These Figures show the discharge capacity of the material used in an electrolytic cell during successive discharge cycles. The cell was cycled at 30° C. at a constant current C of 0.5 mAcm$^{-2}$ between the potential limit 2.4 and 4.6 V to simulate the behaviour of a rechargeable battery. These Figures demonstrate that lithium can be chemically or electrochemically extracted from and reinserted into these materials, i.e. it is an intercalation/insertion electrode.

FIG. 2 shows the discharge capacity in mnAhg$^{-1}$ over 150 cycles at C/8 and 1C for $Li_xMn_{0.95}Ni_{0.025}Co_{0.025}O_2$, i.e. where M is Ni and the additional dopant is Co.

FIG. 3 shows the discharge capacity in mAhg$^{-1}$ over 50 cycles at C/8 for $Li_xMn_{1-y}Co_{y/2}Al_{y/2}O_2$, i.e. where M is Co and the additional dopant is Al, for varying percentages of Co and Al. The discharge capacity is similar for all three compositions shown and is similar to the discharge at C/8 for $Li_xMn_{0.95}Ni_{0.025}Co_{0.025}O_2$.

FIG. 4 shows the discharge capacity in mAhg-1 over 150 cycles at a rate of C/4/50 mAg$^{-1}$ between voltage limits of 2.4-4.6V for $Li_xMn_{0.95}M_{0.25}A_{0.025}O_2$, i.e. where M is Li and the additional dopant A is Cu, or Al or Zn. Better discharge properties are seen for the materials having the dopant pairs Li, Cu and Li Al.

The invention claimed is:

1. A manganese oxide material, wherein the material comprises a host material $Q_qMn_yO_x$, where Q is any element, q, y and x are each any number greater than zero, with a first dopant M and at least one further dopant substituted into the host material, the manganese oxide material having a layered structure in which ions are arranged in a series of generally planar layers stacked one on top of another with successive layers of oxide ions separated by alternating layers of Q ions and Mn ions, the layers thereby being arranged in a repeating sequence comprising a layer of Q ions, a layer of oxide ions, a layer of Mn ions and a further layer of oxide ions, with M ions and said at least one further dopant substituted into layers of Mn ions, producing a multiply doped material, wherein combinations of M and said at least one further dopant are selected from Ni, Co; Al, Co; Li, Co; Li, Ni; Li, Mg; Li, Cu; Li, Al and Li, Zn.

2. A manganese oxide material according to claim 1, wherein Q is chosen from Group I elements.

3. A manganese oxide material according to claim 2, wherein Q is Li and the material is of the form $Li_wMn_yM_zA_aO_x$, where A is any element and is said at least one further dopant, and w, z and a are each any number greater than zero.

4. A manganese oxide material according to claim 3, wherein z=0.025.

5. A manganese oxide material according to claim 1, wherein Q is Li and M is either Co, Ni, Al, or Li.

6. A manganese oxide material according to claim 1, wherein x is 2.

7. A manganese oxide material according to claim 1, wherein y=0.95.

8. A manganese oxide material according to claim 1, wherein M and said at least one further dopant are present in equal amounts.

9. A manganese oxide material according to claim 1, wherein y is in the range 0.80 to 0.975.

* * * * *